United States Patent Office 3,418,844
Patented Dec. 31, 1968

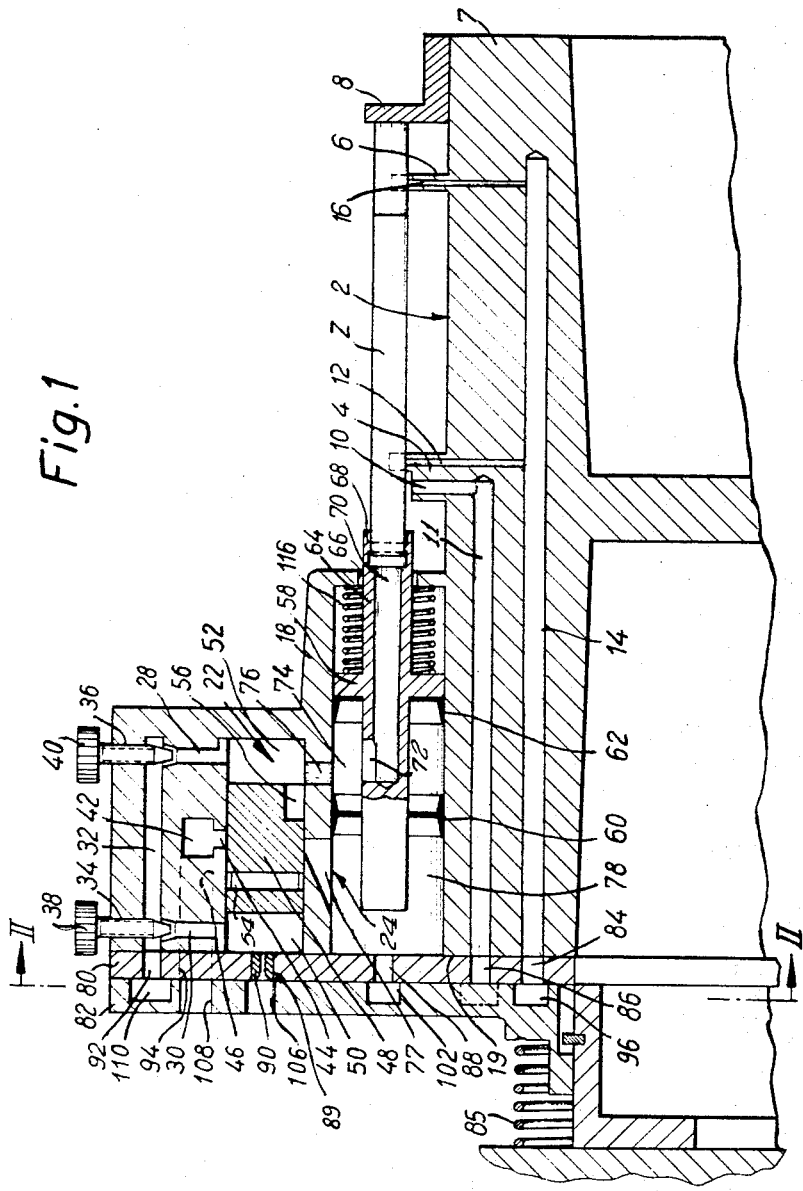

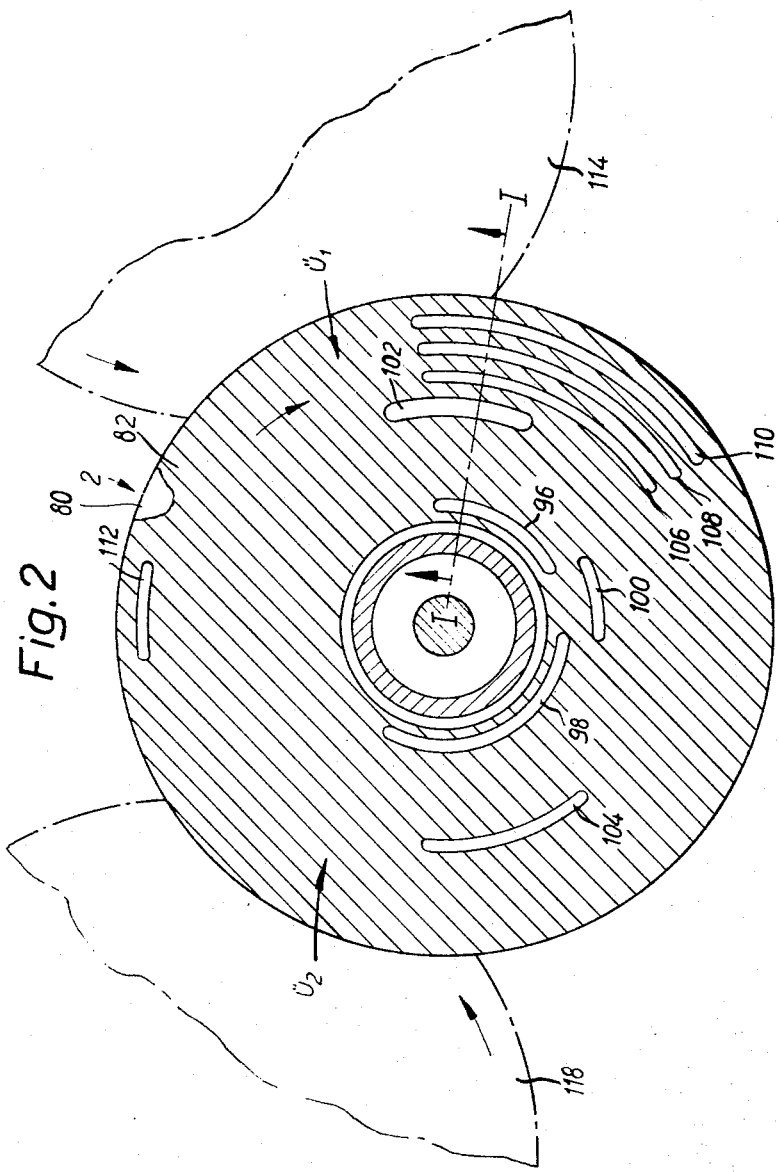

3,418,844
METHOD AND APPARATUS FOR TESTING
CIGARETTES OR THE LIKE
Guenter Wahle, Hamburg-Bramfeld, Germany, assignor
to Hauni-Werke Koerber & Co., KG., Hamburg-Bergedorf, Germany
Filed Dec. 2, 1966, Ser. No. 598,690
28 Claims. (Cl. 73—45.1)

ABSTRACT OF THE DISCLOSURE

The integrity of porous wrappers in cigarettes is tested by streams of testing air each of which is admitted into one end of the respective wrapper to pass through the pores whereby the pressure of testing streams changes as a function of the condition of the respective wrappers. The pressure of each testing stream is compared with the pressure of a flowing reference stream whereby the difference between such pressures indicates whether or not the respective wrappers are defective.

Background of the invention

The present invention relates to a method and apparatus for testing the integrity of cigarettes, cigars, cigarillos, filter cigarettes, filter rod sections and analogous rod-shaped articles wherein an open-ended tubular wrapper of paper, cork, tobacco leaves, tobacco foil or the like surrounds a permeable filler of tobacco and/or filter material. More particularly, the invention relates to improvements in a method and apparatus for testing the integrity of wrappers in cigarettes or like rod-shaped articles by streams of air which are caused to pass through at least one end of the wrapper.

In accordance with presently prevailing testing methods, wrappers of cigarettes or like rod-shaped articles are tested by streams of air which are caused to pass through the fillers. Such testing is normally carried out while the articles travel sideways with a drum or another suitable testing conveyor. The pressure of a compressed air stream which is conveyed through a wrapper will drop if the wrapper is defective, for example, if the wrapper is torn or if the seam which connects the overlapping edges is defective, and such drop in pressure is detected by a testing device which causes or initiates immediate or delayed ejection or segregation of the defective article. Such testing devices measure the absolute pressure of testing air and must be designed with a view to avoid segregation of fully satisfactory articles and/or segregation of articles whose wrappers are imperfect but are still satisfactory. Moreover, conventional testing devices cannot compensate for all factors, other than actual leaks in the wrappers, which influence the pressure of testing air.

It is an object of the present invention to provide an improved method and apparatus for testing cigarettes with streams of testing air in such a way that the testing operation can be carried out while the articles to be tessed travel at a high speed and in a relatively long portion of the path of travel of the articles to insure that each successive article can be tested with the same degree of accuracy.

Another object of the invention is to provide a pneumatic testing method which does not require direct measurements of testing air and according to which the testing operation is influenced solely by the presence or absence of leaks in the wrappers.

A further object of the invention is to provide a testing method which can be carried out by resorting to compressed air or suction air.

An additional object of the invention is to provide a testing method which can be carried out by resorting to a compact apparatus.

A concomitant object of the invention is to provide a testing apparatus which can be built into presently known cigarette making or analogous machines.

Summary of the invention

One feature of the invention resides in the provision of a method of testing the integrity of a succession of cigarettes or similar rod-shaped articles wherein an open-ended tubular wrapper surounds an air-permeable filler. The method compises introducing gaseous testing streams into a succession of enclosures which include the wrappers of successive articles whereby the characteristics of such testing streams vary as a function of the condition of respective wrappers, comparing the characteristics of successive testing streams with the characteristics of a gaseous reference stream to determine the extent of differences between such characteristics, and segregating an article from the succession of articles when the difference between the characteristics of the respective testing stream and the reference stream reaches a value which is indicative of a defective wrapper. For example, the method may be carried out in such a way that, when an enclosure includes a satisfactory wrapper, the characteristics of the reference stream are identical with the characteristics of the respective testing stream. At this time, I prefer to compare the pressure of the reference stream with the pressure of testing streams whereby the pressure of a stream of compressed testing air drops below the pressure of the reference stream and the pressure of a suction steam of testing air rises above the pressure of a reference suction stream if the testing air enters an enclosure which includes a defective wrapper.

Brief description of the drawings

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawings, in which:

FIG. 1 is a fragmentary axial section through the testing conveyor of an apparatus which embodies my invention and wherein the wrappers of rod-shaped articles are tested by comparing the characteristics of streams of compressed testing air with the characteristics of reference streams of compressed air, the section being taken in the direction of arrows from the line I—I of FIG. 2; and FIG. 2 is a transverse section through the apparatus as seen in the direction of arrows from the line II—II of FIG. 1.

Description of the preferred embodiments

FIG. 1 shows a portion of a drum-shaped testing conveyor 2 which is rotated about a horizontal axis and is provided with a series of equidistant axially parallel peripheral pockets or holders for filter cigarettes Z. Each pocket comprises two aligned troughs 4 and 6. It will be noted that FIG. 1 shows the troughs 4, 6 of a single pocket and that the trough 4 is provided with a discharge port 10 extending radially outwardly from a pressure channel 11 which is machined into the conveyor 2 and is connectable with a source of compressed air. The troughs 4, 6 are respectively provided with radially extending suction ducts 12 and 16 connected with an axially parallel suction channel 14 machined into the conveyor 2. Suction in the ducts 12, 16 holds the cigarette Z in the respective pocket and such suction is terminated when the cigarette is to be ejected or transferred onto a receiving conveyor. A stop 8 provided on the right-hand end portion 7 of the conveyor 2 is aligned with the troughs 4, 6 and can seal one end of the tubular wrapper which forms part of the cigarette Z. One such stop 8 is provided for each pocket of the conveyor 2 or the latter comprises an annular stop which can seal one end of each cigarette on the conveyor.

The left-hand end face 19 of the conveyor 2 is adjacent to a larger-diameter housing 18 of the conveyor, and this housing accommodates various air flow regulating and article retaining parts. The housing 18 is provided with pairs of cylinders 22, 24, one pair for each pocket, and each cylinder 22 is located radially outwardly of the corresponding cylinder 24. The outer cylinder 22 of FIG. 1 is connected with two radially outwardly extending supply channels 28, 30 and the outer end of each channel flares away from the axis of the conveyor. Such outwardly flaring ends receive the conical tips of two regulating screws 38, 40 which control the flow of compressed air from an axially parallel feed channel 32 machined into the housing 18. The screws 38, 40 are rotatable and then move axially in tapped bores 34, 36 of the housing 18 and may increase or reduce the flow of compressed air into the supply channels 28, 30.

The central portion of the outer cylinder 22 is adjacent to an air evacuating chamber 42 and communicates therewith through a throat 44. A channel 46 connects the evacuating chamber 42 with the left-hand end face 19 of the conveyor 2. The cylinder 22 accommodates a reciprocable control piston 48 which normally seals its interior from the throat 44 and evacuating chamber 42. This control piston divides the interior of the cylinder 22 into a pair of compartments 50, 52 and has a diametrically extending bore 54 which can be moved into registry with the throat 44. The control piston 48 is further provided with a cutout or notch 56 which is adjacent to the compartment 52.

The inner cylinder 24 accommodates a working or clamping piston 58 which carries two rings 60, 62 in sealing engagement with the surface surrounding the cylinder 24. The clamping piston 58 is provided with an extension or piston rod 64 which extends through an opening 66 of the housing 18 and is in registry with the concave seats of troughs 4, 6. The outer (right-hand) end portion 68 of the piston rod 64 constitutes a clamping element and resembles a nozzle which can be moved into sealing engagement with the left-hand end of the cigarette Z. The piston rod 64 has an axially extending testing bore 70 which can direct compressed testing air into the left-hand end face of the rod-shaped filler in the wrapper of the cigarette Z. A radial bore 72 of the piston rod 64 connects the left-hand end of the testing bore 70 with that section (74) of the cylinder 22 which extends between the rings 60 and 62. The section 74 of the cylinder 24 is in permanent communication with the compartment 52 of the cylinder 22 through a radial bore 76 of the housing 18, i.e., the working piston 58 cannot prevent the flow of air from the compartment 52 into the testing bore 70. The left-hand section 78 of the cylinder 24 is sealed from the section 74 by the ring 60 and can be connected with the evacuating chamber 42 through a radially inwardly flaring outlet passage 77 of the housing 18.

The left-hand end face 19 of the conveyor 2 is adjacent to an apertured valve plate 80 which rotates with the conveyor and is adjacent to a slotted distributor disk 82. The latter is biased against the valve plate 80 by a helical spring 85. The disk 82 is stationary.

The valve plate 80 has several apertures or bores for each pair of cylinders 22, 24. These bores include a radially innermost suction bore 84 which is in registry with the suction channel 14, a first pressure bore 86 which communicates with the discharge port 10 through the pressure channel 11 of the conveyor 2, a second pressure bore 88 which registers with and constitutes an inlet for the section 78 of the inner cylinder 24, a bore 89 which accomodates an exchangeable outlet member or throttle 90 defining a restricted flow path for air leaving the compartment 50 of the outer cylinder 22, and a radially outermost bore 92 which admits compressed air into the feed channel 32. A further bore 94 (shown by broken lines) is provided in the valve plate 80 between the bores 89 and 92 to permit escape of air from the channel 46 and evacuating chamber 42. In response to rotation of the conveyor 2 and valve plate 80, the bores 84, 86, 88, 89, 94, 92 will be placed into registry with selected arcuate slots provided in the distributor disk 82.

The distribution and length of slots in the disk 82 is illustrated in FIG. 2. These slots are arranged in six concentric circles and include two independent innermost slots 96, 98 which can be placed into registry with the bore 84 (suction channel 14 and ducts 12, 16), a slot 100 which can register with the bore 86 (pressure channel 11 and discharge port 10) and overlies the gap between the slots 96 and 98, a slot 102 which can register with the bore 88 to communicate with the section 78 of the inner cylinder 24, a slot 104 which is in communication with the atmosphere and can register with the opening 88 and section 78 (i.e., the radii of curvature of the slots 102, 104 are identical), a slot 106 which is in permanent communication with the atmosphere and can register with the passage of the throttle 90, a slot 108 which is also in communication with the atmosphere and can register with the bore 94, a first radially outermost slot 110 which is disposed in the same sector as the slots 106, 108 and can register with the bore 92 to admit compressed air into the feed channel 32, and a second radially outermost slot 112 which is substantially shorter than slot 110 and is connected to a suction generating device. The slots 110, 112 have identical radii of curvature.

FIG. 2 further illustrates a delivery conveyor here shown as a drum 114 which supplies cigarettes Z into successive pockets of the testing conveyor 2 at a first transfer station $Ü_1$, and a receiving conveyor or drum 118 which receives satisfactory cigarettes Z at a second transfer station $Ü_2$. The conveyors 114, 118 are driven in a counterclockwise direction and the conveyor 2 rotates in a clockwise direction, as viewed in FIG. 2. The conveyors 114, 118 may retain the cigarettes Z by suction or the testing apparatus may comprise suitable shields which hold the cigarettes against the action of gravity and centrifugal force.

Referring again to FIG. 1, the housing 18 accommodates helical expansion springs 116 which bias the respective clamping pistons 58 away from the corresponding pockets to separate the nozzles 68 from the adjoining ends of the wrappers. This housing 18 preferably comprises a plurality of portions each of which is provided with two cylinders 22, 24, pistons 48, 58, screws 38, 40, a throttle 90 and a spring 116.

The operation is as follows:

When a cigarette Z on the delivery conveyor 114 reaches the transfer station $Ü_1$, it enters a pocket of the testing conveyor 2 and moves with the corresponding troughs 4, 6 toward and past an elongated testing station. Upon completed transfer of a cigarette Z, the corresponding inlet bore 88 of the valve plate 80 moves into registry with the slot 102 of the distributor disk 82 whereby the section 78 of the inner cylinder 24 receives compressed air to displace the ring 60 in a direction to the right, as viewed in FIG. 1, and to compress the spring 116. The nozzle 68 engages the adjoining end of the wrapper and pushes the other end of the wrapper into sealing engagement with the stop 8. The cigarette Z is now accurately aligned with the piston rod 64 and is clamped and thereby held against the action of gravity and centrifugal force. As the conveyor 2 continues to rotate in the direction of arrow (FIG. 2), the bore 84 of the valve plate 80 moves into registry with the slot 96 to connect the channel 14 and ducts 12, 16 with a suction fan whereby the cigarette Z is held by suction in addition to such clamping action which is produced by the nozzle 68 and stop 8. Movement of the bore 84 into registry with slot 96 is almost simultaneous with movement of bores 89, 92 and 94 into registry with slots 106, 110 and 108. The compartment 50 is then connected with the atmosphere via throttle 90 and slot 106, and the evacuating chamber 42 is connected with the atmosphere via channel 46, bore 94 and slot 108. The slot 110 admits a main stream of compressed air via bore 92 whereby such main stream enters the feed channel 32 to be divided into a testing stream flowing into the supply channel 28 and a reference stream which flows into the channel 30. The testing stream flows through the compartment 52, bore 76, section 74, bore 72, bore 70 and into the interior of the wrapper of cigarette Z. The wrapper is porous so that a portion of the testing stream escapes into the atmosphere whereby a characteristic of this testing stream changes as a function of the condition of the wrapper, i.e., the pressure of the testing stream will drop less if the wrapper is satisfactory but will drop more if the wrapper has one or more leaks which may be due to actual puncturing or tearing of wrapping material or to deficiency of the seam formed by the overlapping longitudinal edges of the wrapper. During testing, the wrapper forms part of an enclosure which receives the testing stream and which further includes the piston 58 and a portion of the housing 18.

The reference stream flows through a chamber including the compartment 50 and leaks through the passage of the throttle 90. This passage is dimensioned in such a way that the amount of leakage is the same as the amount of leakage through a satisfactory wrapper. Thus, if a wrapper is satisfactory, the two streams are identical and the air pressure at both sides of the control piston 48 (compartments 50 and 52) is the same. The control piston remains in a neutral or central position in which the radially inwardly flaring outlet passage 77 of the section 78 is out of registry with the bore 54 and is not in communication with the evacuating chamber 42. This insures that the clamping piston 58 remains in the operative position of FIG. 1 in which the nozzle 66 engages and seals the adjoining end of the wrapper against uncontrolled escape of testing air.

The conveyor 2 continues to rotate and places the bore 86 of valve plate 80 into registry with the compressed-air slot 100 of the distributor disk 82. The port 10 then discharges a blast of compressed air but the cigarette Z remains in its troughs 4 and 6 because it is securely clamped by the nozzle 68 of the working piston 58. As shown in FIG. 2, the slot 100 overlies the gap between the suction slots 96, 98 so that no suction exists in the ducts 12 and 16 when the channel 11 and its port 10 receive compressed air. However, once the bore 86 has moved beyond or approaches the end of the slot 100, the bore 84 moves into registry with the suction slot 98 and the cigarette Z is again held by suction. A little later, the bore 88 reaches the slot 104 which is connected to the atmosphere whereby the pressure in the section 78 drops and the spring 116 expands to disengage the nozzle 68 from the cigarette Z. Such disengagement takes place in good time to permit unimpeded transfer of satisfactory cigarettes at the station Ü₂ whereby the conveyor 118 advances such cigarettes to storage, to a packaging machine, to a stacking machine, or to another destination. The conveyor 2 continues to rotate and places the bore 92 into registry with the suction slot 112 to insure that the control piston 48 invariably returns or remains in neutral position.

If the wrapper of a cigarette Z is defective, a larger quantity of testing air escapes from the aforementioned enclosure which includes the defective wrapper. The pressure of the reference stream in compartment 50 exceeds the pressure of the testing stream in compartment 52 whereby the control piston 48 moves in a direction to the right, as viewed in FIG. 1 and places the bore 54 into registry with the evacuating chamber 42 and passage 77. Compressed air is free to escape from the sections 78 via 77, 54, 44, 42, 46, 94 and 108 so that the spring 116 expands and moves the nozzle 68 away from the defective cigarette Z. This cigarette is ejected by the blast of compressed air issuing from the port 10 when the bore 86 moves into registry with the slot 100.

The testing apparatus of my invention can be operated with equal advantage by utilizing reference streams and testing streams which are maintained below atmospheric pressure. The bore 70 is then connected to a suction fan to draw a stream of testing air through the wrapper. If the wrapper is satisfactory, the pressure of such testing stream remains within a certain range and such pressure is then compared with the pressure of a reference stream which is drawn through the throttle 90. If the wrapper is defective, the pressure of the testing stream exceeds the pressure of the reference stream and causes a displacement of the control piston which, in turn, causes the clamping piston to release the defective cigarette. Of course, the testing conveyor then comprises a modified housing which enables the control pistons to effect a disengagement of clamping pistons from defective cigarettes when the pressure of a testing stream exceeds the pressure of the reference stream.

That portion of the housing 18 which defines the channel 28, compartment 52, bore 76 and cylinder section 74 constitutes a testing chamber which is connectable with the cigarette Z by the clamping piston 58 to form with the wrapper of such cigarette an enclosure for the testing stream. The regulating screw 38 and throttle 90 form part of means for establishing a reference stream whose characteristics are compared with the characteristics of the testing stream by piston 48. The extent of movement of this piston 48 from neutral position is a function of differences between the characteristics of the two streams.

The testing station extends along the slot 110 of the distributor disk 82. It will be seen that the articles are treated in a relatively long portion of their path in the pockets of the conveyor 2 so that they can be transported at a high speed, i.e., each control piston 48 will have ample time to change its position and to initiate segregation of a defective article before the bore 92 of the valve plate 80 moves beyond the slot 110. Each control piston 48 will move from its central position if the characteristics of the testing streams differ from the characteristics of the reference streams. If differences suffice to place the bore 54 of a control piston 48 into partial or full registry with the respective passage 77 and evacuating chamber 42, this indicates the presence of a defective wrapper and the article including such a defective wrapper is then segregated from satisfactory articles. The cutouts 56 insure that the compartments 52 remain in communication with the respective bores 76.

The screws 38, 40 regulate the rate of air flow into the supply channels 30, 28 and are adjusted in such a way that the pressure in compartment 52 drops when the respective wrapper has a leak, i.e., the rate of air flow into the compartment 52 should be less than the rate of air flow into the bore 76 when the wrapper is defective and allows escape of testing air through its pores as well as through one or more tears, punctures or slots in the wrapper.

If desired, the control pistons 48 need not directly effect ejection or segregation of defective articles. For example, each control piston can be coupled to a mechanical or electromechanical signal generated device which produces a signal whenever the displacement of the control piston indicates the presence of a defective wrapper. Such signals can be utilized for immediate or delayed ejection of defective articles. However, the arrangement which is illustrated in FIG. 1 has been found to be very satisfactory because the control piston 48 need not be positively connected with the clamping piston 58 but is nevertheless capable of bringing about automatic segregation of defective articles by causing a change in the axial position of the nozzle 68.

The valve plate 80 can be considered as forming part of the testing conveyor 2. It is produced as a separate unit to facilitate the machining of cylinders 22, 24 and other cavities in the housing 18. Furthermore, the plate 80 protects the housing 18 against wear. Any wear due to friction between the distributor disk 82 and valve plate 80 is compensated for by the spring 85.

Without further analysis, the foregoing will so fully reveal the gist of the present invention that others can, by applying current knowledge, readily adapt it for various applications without omitting features which fairly constitute essential characteristics of the generic and specific aspects of my contributions to the art and, therefore, such adaptations should and are intended to be comprehended within the meaning and range of equivalence of the following claims.

What is claimed as new and desired to be protected by Letters Patent is set forth in the appended claims.

I claim:

1. A method of testing the integrity of a succession of cigarettes or similar rod-shaped articles wherein an open-ended porous tubular wrapper surrounds an air-permeable filler, comprising the steps of introducing gaseous testing streams into a succession of enclosures which include the wrappers of successive articles whereby the testing streams pass through the pores and their characteristics vary as a function of the condition of the respective wrappers; and comparing the characteristics of successive testing streams with the characteristics of a flowing gaseous reference stream to determine the extent of differences between such characteristics.

2. A method as defined in claim 1, further comprising the step of segregating an article from said succession of articles when the difference between the characteristics of the respective testing stream and said reference stream reaches a value which is indicative of a defective wrapper.

3. A method as defined in claim 2, wherein the characteristics of said reference stream and said testing streams are identical when the respective enclosures include satisfactory wrappers.

4. A method as defined in claim 2, wherein said characteristics are the pressures of said streams.

5. A method as defined in claim 2, further comprising the step of sealing one end of each wrapper during introduction of the respective testing stream through the other end.

6. A method as defined in claim 5, wherein said testing streams are introduced into respective enclosures at superatmospheric pressure.

7. A method as defined in claim 2, wherein said reference stream and said testing streams are formed by subdivision of a main stream.

8. A method as defined in claim 2, further comprising the step of conveying said succession of articles sideways in a predetermined path, said segregating step comprising ejecting articles with defective wrappers from said path.

9. A method as defined in claim 8, further comprising the step of mechanically holding the articles in said path during introduction of said testing streams and terminating the mechanical holding action in response to detection of defects in wrappers on completed comparison of said reference stream with the respective testing streams.

10. Apparatus for testing the integrity of a succession of cigarettes or similar rod-shaped articles wherein an open-ended porous wrapper surrounds an air-permeable filler, comprising a conveyor for advancing a succession of articles past a testing station; testing chambers provided on said conveyor and each connectable with one end of a wrapper to form therewith an enclosure while the respective article travels past said testing station; means for introducing gaseous streams into said enclosures during travel past said testing station whereby the testing streams entering satisfactory wrappers pass through the pores of such wrappers and their characteristics are different from those of testing streams which enter defective wrappers; means for establishing flowing gaseous reference streams during travel of articles past said testing station; and means for comparing the characteristics of said testing streams with characteristics of said reference streams, said last named means comprising control members movable with reference to said conveyor as a function of the extent of differences between the characteristics of said testing and reference streams.

11. Apparatus as defined in claim 10, wherein said conveyor is provided with second chambers each of which is separated from a testing chamber by one of said control members, each of said second chambers defining a passage for a reference stream during travel past said testing station and said control members being movable in response to differences in pressure of said testing and reference streams.

12. Apparatus as defined in claim 10, wherein each of said testing chambers comprises clamping means each engageable with one end of a wrapper during travel past said testing station and means for disengaging said clamping means from such wrappers in response to predetermined movement of the respective control members.

13. Apparatus as defined in claim 12, wherein each of said clamping means comprises a working piston reciprocably received in a cylinder of said conveyor and having a nozzle movable into and away from sealing engagement with one end of a wrapper.

14. Apparatus as defined in claim 13, wherein each of said working pistons has an axially extending bore forming part of the respective testing chamber and arranged to convey testing gas which passes into the respective wrapper.

15. Apparatus as defined in claim 10, wherein said conveyor comprises a rotary drum having axially parallel article-supporting pockets adjacent to one end and a housing adjacent to the other end thereof, said testing chambers and all of said means being provided in said housing.

16. Apparatus as defined in claim 15, further comprising stationary distributor means for admission and evacuation of gases from said housing, said housing having an apertured portion adjacent to said distributor means.

17. Apparatus as defined in claim 16, wherein said distributor means is provided with a plurality of arcuate slots which register with selected apertures of said apertured portion in predetermined angular positions of said housing.

18. Apparatus as defined in claim 17, wherein said slots are distributed in radial and circumferential directions of said distributor means and include gas-admitting inner and outer slots and an intermediate slot for discharging said reference streams into the atmosphere.

19. Apparatus as defined in claim 16, wherein said apertured portion is constituted by a valve plate disposed between the remainder of said housing and said distributor means.

20. Apparatus for testing the integrity of a succession of cigarettes or similar rod-shaped articles wherein an open-ended wrapper surrounds an air-permeable filler, comprising a conveyor for advancing a succession of articles past a testing station; testing chambers provided on said conveyor and each connectable with one and of a wrapper to form therewith an enclosure while the respective article travels past said testing station; means for introducing gaseous testing streams into said enclosures during travel past said testing station whereby the characteristics of testing streams entering satisfactory wrappers are different from those of testing streams which enter defective wrappers; means for establishing gaseous reference streams during travel of articles past said testing station; and means for comparing the characteristics of said testing streams with the characteristics of said reference streams, said last named means comprising control members movable with reference to said conveyor as a function of the extent of differences between the characteristics of said testing and reference streams, said conveyor being provided with second chambers each of which is separated from a testing chamber by one of said control members and each of said second chambers defining a passage for a reference stream during travel past said testing station, said control members being movable in response to differences in pressure of said testing and reference streams, said conveyor being further provided with a plurality of cylinders and said control members constituting pistons reciprocable in said cylinders and dividing such cylinders into first and second compartments which respectively form part of said testing and second chambers.

21. Apparatus as defined in claim 20, wherein each of said testing chambers further comprises a bore connecting the respective first compartment with one end of the respective wrapper and a first supply conduit for admitting testing gas into the respective first compartment, each of said second chambers comprising an outlet connecting the respective second compartment with the atmosphere and a second supply conduit for admitting the reference stream into the respective second compartment.

22. Apparatus as defined in claim 20, further comprising means for regulating the admission of gases into said compartments.

23. Apparatus for testing the integrity of a succession of cigarettes or similar rod-shaped articles wherein an open-ended wrapper surrounds an air-permeable filler, comprising a conveyor for advancing a succession of articles past a testing station; testing chambers provided on said conveyor and each connectable with one end of a wrapper to form therewith an enclosure while the respective article travels past said testing station, each of said testing chambers comprising clamping means each engageable with one end of a wrapper during travel past said testing station and each of said clamping means comprising a working piston reciprocably received in a cylinder of said conveyor and having a nozzle movable into and away from sealing engagement with one end of a wrapper, each of said cylinders comprising two sections one of which forms part of the respective testing chamber and the other of which is connectable with the atmosphere and with a source of compressed gas; means for introducing gaseous testing streams into said enclosures during travel past said testing station whereby the characteristics of testing streams entering satisfactory wrappers are different from those of testing streams which enter defective wrappers; means for establishing gaseous reference streams during travel of articles past said testing station; means for comparing the characteristics of said testing streams with the characteristics of said reference streams, said last named means comprising control members movable with reference to said conveyor as a function of the extent of differences between the characteristics of said testing and refernce streams; and means for disengaging said clamping means from the wrappers in response to predetermined movement of the respective control members.

24. Apparatus for testing the integrity of a succession of cigarettes or similar rod-shaped articles wheerin an open-ended wrapper surrounds an air-permeable filler, comprising a conveyor for advancing a succession of articles past a testing station; testing chambers provided on said conveyor and each connectable with one end of a wrapper to form therewith an enclosure while the respective article travels past said testing station, each of said testing chambers comprising clamping means each engageable with one end of a wrapper during travel past said testing station and each of said clamping means comprising a working piston reciprocably received in a cylinder of said conveyor and having a nozzle movable into and away from sealing engagement with one end of a wrapper, each of said working pistons comprising two sealing rings subdividing the respective cylinder into two sections one of which forms part of the respective testing chamber; means for introducing gaseous testing streams into said enclosures during travel past said testing station whereby the characteristics of testing streams entering satisfactory wrappers are different from those of testing streams which enter defective wrappers; means for establishing gaseous reference streams during travel of articles past said testing station; means for comparing the characteristics of said testing streams with the characteristics of said reference streams, said last named means comprising control members movable with reference to said conveyor as a function of the extent of differences between the characteristics of said testing and reference streams; and means for disengaging said clamping means from the wrappers in response to a predetermined movement of the respective control members.

25. Apparatus as defined in claim 24, wherein the other section of each cylinder has an inlet for compressed gas and an outlet which is controlled by the respective control member and is exposed to permit escape of gas from such other section when the movement of the respective control member is indicative of a defective wrapper.

26. Apparatus as defined in claim 25, wherein said control members comprise control pistons which directly control the flow of air through said outlets.

27. Apparatus as defined in claim 26, wherein each of said control pistons has a bore which is movable into and out of registry with the respective outlet.

28. Apparatus for testing the integrity of a succession of cigarettes or similar rod-shaped articles wherein an open-ended wrapper surrounds an air-permeable filler, comprising a conveyor for advancing a succession of articles past a testing station; testing chambers provided on said conveyor and each connectable with one end of a wrapper to form therewith an enclosure while the respective article travels past said testing station, said conveyor comprising a rotary drum having axially parallel article-supporting pockets adjacent to one end and a housing adjacent to the other end thereof; means for introducing gaseous testing streams into said enclosures during travel past said testing station whereby the characteristics of testing streams entering satisfactory wrappers are different from those of testing streams which enter defective wrappers; means for establishing gaseous reference streams during travel of articles past said testing station; means for comparing the characteristics of said testing streams with the characteristics of said reference streams, said last named means comprising control members movable with reference to said conveyor as a function of the extent of differences between the characteristics of said testing and reference streams, said testing chambers and all of said means being provided in said housing; stationary distributor means for admission and evacuation of gases from said housing, said housing having an apertured portion adjacent to said distributor means and provided with an annulus of apertures each of which accommodates a removable throttle for escape of reference streams from said housing.

References Cited

UNITED STATES PATENTS

| | | | |
|---|---|---|---|
| 3,178,932 | 4/1965 | Stuchbery et al. | 73—45.2 |
| 3,237,444 | 3/1966 | Kaeding et al. | 73—45.1 |

FOREIGN PATENTS 1,205,434  11/1965  Germany.

S. CLEMENT SWISHER, *Acting Primary Examiner.*

J. NOLTON, *Assistant Examiner.*

U.S. Cl. X.R.

209—74